Inventor:
Hans Fischer

May 9, 1939.　　　H. FISCHER　　　2,157,658
INJECTION ENGINE
Filed July 22, 1937　　　3 Sheets-Sheet 2

Inventor:
Hans Fischer
By: Brown, Jackson, Boettcher & Dienner
Attys

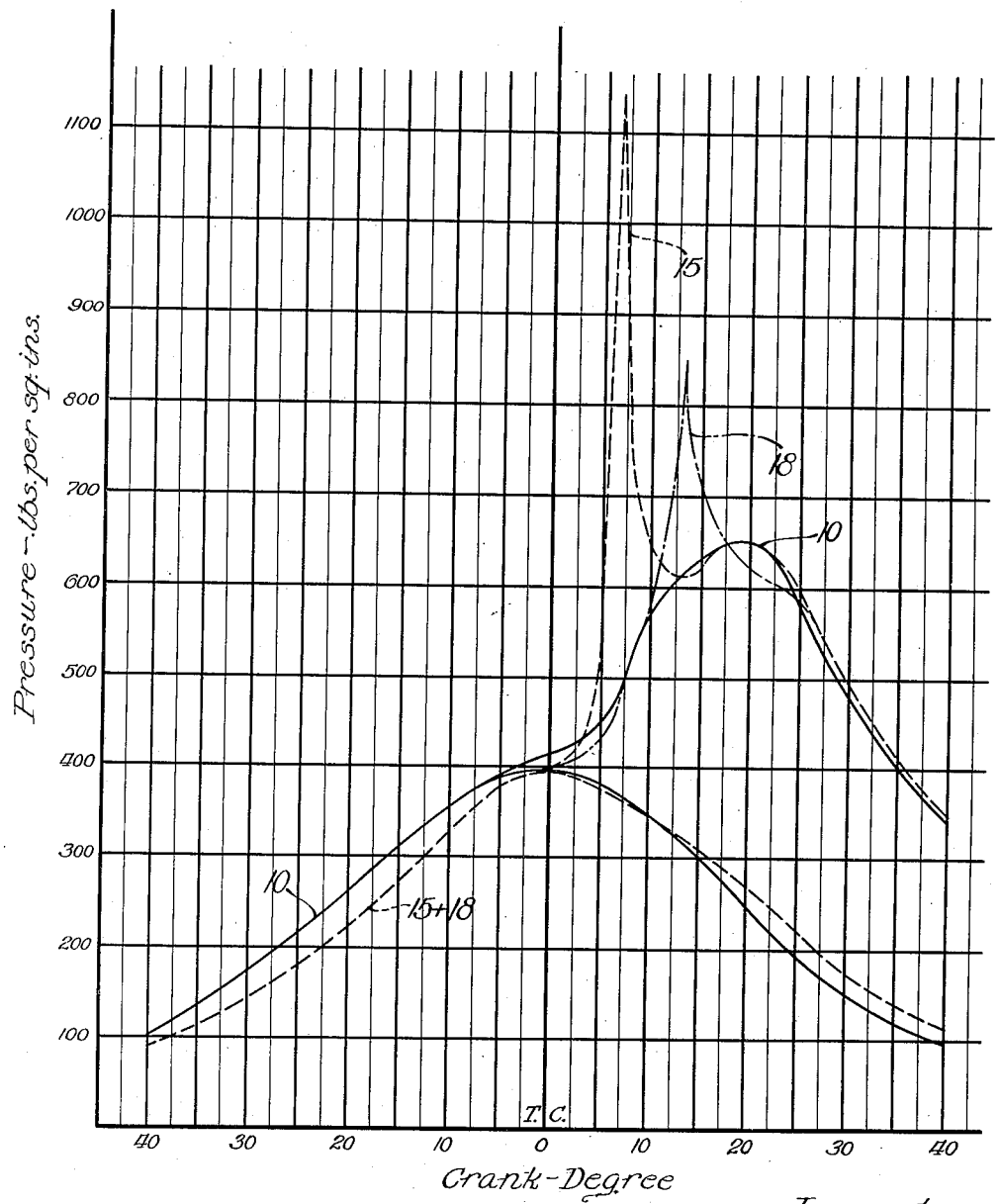

Patented May 9, 1939

2,157,658

UNITED STATES PATENT OFFICE 2,157,658

INJECTION ENGINE

Hans Fischer, Yonkers, N. Y., assignor to Lanova Corporation, New York, N. Y., a corporation of Delaware Application July 22, 1937, Serial No. 155,032

7 Claims. (Cl. 123—32)

This invention relates to injection engines, and has to do with an injection engine of the supplementary chamber type.

My invention is directed primarily to providing, in an engine of the character stated, means for maintaining the pressure within the cylinder more nearly constant during the combustion or working stroke of the piston, with a view to obtaining increased smoothness and efficiency in operation of the engine. More specifically, my invention has to do with a novel relation and cooperation of the injection nozzle and supplementary chambers such that blasts are successively ejected from the latter into the combustion chamber, with the effect of increasing the rate of combustion during the early portion of the combustion stroke for maintaining substantially constant pressure within the cylinder. Further objects and advantages will appear from the detail description.

In the drawings:

Figure 5 is an indicator card showing the time pressure curves of the main combustion chamber, the primary supplementary chamber and the secondary supplementary chamber, in superposed relation.

Figure 1:
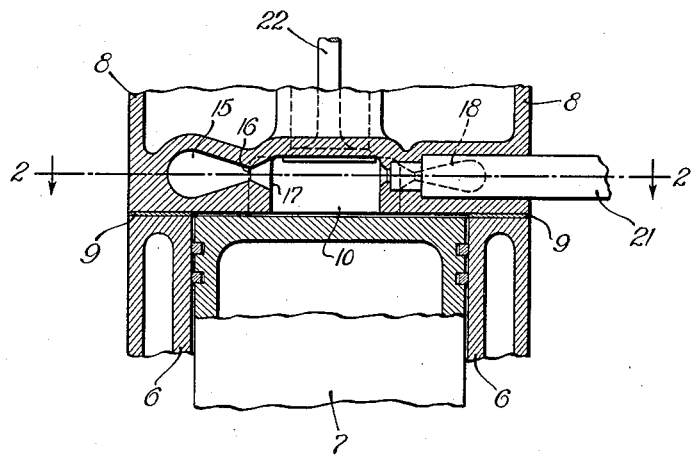
Figure 1 is a fragmentary axial sectional view through the upper end portion of the cylinder and the head of an engine embodying my invention, showing those parts with which my invention is concerned, this view being taken substantially in the plane of line 1—1 of Figure 2, certain parts being shown in elevation.

I have shown my invention, for purposes of illustration, as applied to a single cylinder engine. This engine comprises a water jacketed cylinder 6, a piston 7 operating therein and a water jacketed head 8 closing the upper end of the cylinder and removably secured thereon in a known manner, with an intervening gasket 9. Head 8 comprises a main combustion chamber 10 defining, in plan, two substantially circular lobes 11 with a constriction 12 therebetween, defined by a projection 13 extending into the combustion chamber 10 from one side thereof, and a splitting element 14 of substantially V-shape in plan extending into chamber 10 at the opposite side thereof, with the vertex of element 14 alined with the center of projection 13.

Head 8 further comprises a primary supplementary chamber 15, opening into the combustion chamber 10 through a restricted orifice 16 and a funnel-like passage 17 leading to the orifice and flaring inward of the combustion chamber. At the side thereof opposite to the primary supplementary chamber 15, head 8 is provided with two secondary supplementary chambers 18, each of materially less capacity than chamber 15, opening into chamber 10 through restricted orifices 19 and funnel-like passages 20 leading to the orifices 19 and flaring inward of the combustion chamber. It will be noted that the passages 20 are disposed at the sides of splitting element 14 adjacent the base thereof, the inner sides of these passages merging into the sides of element 14. An injection nozzle 21 is mounted in head 8, in a known manner, and is provided with a coaxial port opening through the vertex of element 14 and disposed to inject fuel across the combustion chamber 10 toward passage 17 and orifice 16 of the primary chamber 15.

Head 8 is also provided with inlet and exhaust passages opening through the roof of combustion chamber 10, at the lobes 11, these passages being controlled by inlet and exhaust valves 22 and 23, respectively. It will be understood that suitable known means is provided for operating the valves in proper timed relation to operation of the engine, and that pump means, of known type, is provided for supplying fuel under pressure to the injection nozzle, means for timing the injection being also provided, as is well known in the art.

In the operation of the engine, as the piston moves inward on its compression stroke, the displaced air is forced into the combustion chamber 10 and into the supplementary chambers 15 and 18, the instantaneous pressure within the supplementary chambers being lower than that in the combustion chamber, due to the constrictions 16 and 19, respectively. Shortly before the piston reaches its inner dead center position, which is its position of maximum compression, fuel is injected by nozzle 21 toward chamber 15, a certain amount of this fuel entering the chamber, due to the provision of the funnel-like passage 17 and the fact that the piston is still traveling upward causing air to flow through passage 17 and orifice 16 into chamber 15. The fuel entering the chamber is intimately intermixed with the air and forms a readily combustible mixture therein. No fuel is injected into the secondary chambers 18, due to the fact that the injection of fuel is in a direction away from the passages 20. Any fuel which may enter chambers 18, due to flow of air into these chambers, is so slight in amount as to be incapable of producing a combustible mixture within these latter chambers. The major portion of the fuel charge is injected into the constriction of the combustion chamber and there forms a rich mixture with the relatively small volume of air between element 14 and projection 13. When the piston reaches its inner dead center position ignition is initiated, within the combustion chamber 10, by the heat of compression, and spreads by flame propagation into the primary chamber 15, at which time injection of fuel terminates. Due to the fact that the mixture between projection 13 and nozzle 14 is quite rich, containing an excess of fuel, it burns sluggishly with resulting slow increase in pressure within the combustion chamber. On the other hand, the mixture within chamber 15 is such as to burn extremely rapidly causing an abrupt and great increase of pressure within this chamber, the pressure within the latter being then much higher than that obtaining within the main combustion chamber. As a result of this pressure differential, the contents of chamber 15 are ejected therefrom in a high pressure high velocity stream through orifice 16 into the combustion chamber, in the form of a prolonged blast. The effect of this blast is to cause violent agitation of the rich fuel mixture in the mid-portion of the combustion chamber 10, mixing the fuel particles with the air and causing a resulting increase in the rate of combustion within chamber 10. When the blast sets in from chamber 15 the rich fuel-air mixture is driven toward the passages 20, the blast being split by the point element 14. This, in conjunction with the pressure rise in the main combustion chamber, serves to charge the two secondary chambers 18 with the rich fuel-air mixture thus producing within the latter chambers fuel air mixtures which become ignited, by flame propagation from the chamber 10, and burn very rapidly within the chambers 18. As a result, the pressure within these latter chambers is abruptly increased to a high value, relative to that prevailing within chamber 10, and the contents of chambers 18 are then ejected through orifices 19 thereof into combustion chamber 10, in high pressure high velocity streams producing a second blast effect which further increases the turbulence within the combustion chamber and commingling of the fuel and air particles, with resulting increase in the rate of combustion. In this manner, successive blasts are injected into the main combustion chamber with the effect of maintaining therein a high rate of combustion throughout a considerable crank angle, which is conducive to maintaining the pressure within the cylinder at a substantially constant high value for a considerable portion of the outward travel of the piston, resulting in increased smoothness and efficiency in operation of the engine.

The blast from the respective secondary chambers 18 occurs after the blast from the primary chamber 15, as above noted. The portions of the latter blast, split by the element 14, are deflected into lobes 11 substantially tangent thereto and tend to travel about the respective lobes in one direction, as viewed in Figure 2. Shortly thereafter the blasts are ejected from chambers 18 toward projection 13 and are deflected therefrom into the lobes 11, tending to travel about the respective lobes in the opposite direction, as viewed in Figure 2. Accordingly, the blasts from the secondary chambers 18 are oposed to the blast from the primary chamber 15, within the lobes 11, these two blasts meeting head-on, as indicated by the arrows in Figure 2. This assures high general turbulence within the lobes of the combustion chamber, with rapid and intimate intermixing and commingling of the air and the fuel particles, with resulting rapid combustion of the fuel mixture charge, to the end of maintaining substantially constant pressure within the cylinder during the combustion stroke, throughout a considerable portion of the outward travel of the piston, in the manner and for the purposes stated.

Figure 3:
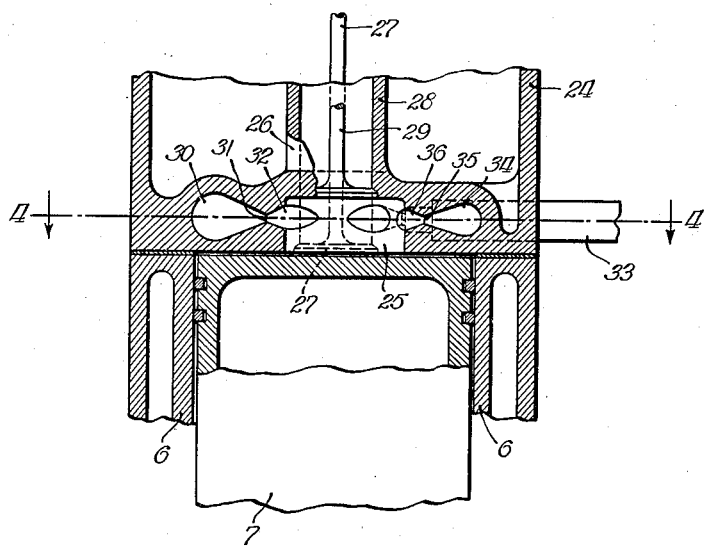
Figure 3 is a view similar to Figure 1, taken substantially on line 3—3 of Figure 4, certain parts being shown in elevation, showing a modified form of my invention.
Figure 4:
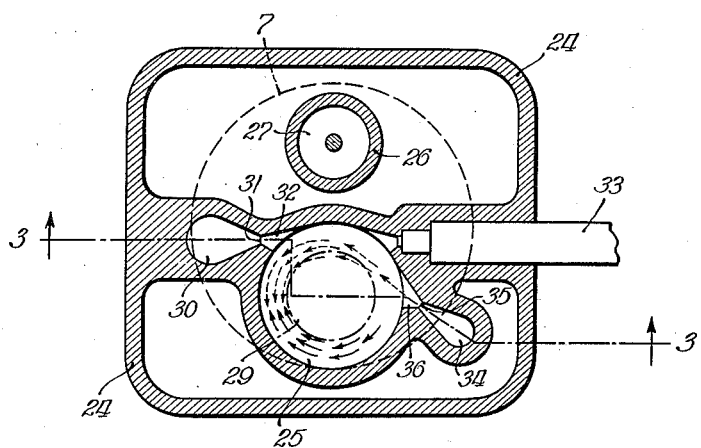
Figure 4 is a sectional view taken substantially on line 4—4 of Figure 3, certain parts being shown in elevation.

In the modified form shown in Figures 3 and 4, cylinder head 24 is provided with a cylindrical combustion chamber 25 overlying and opening downward into the cylinder. Head 24 is also provided with a charging air inlet passage 26 opening through the roof of the cylinder to one side of chamber 25, this passage being controlled by valve 27 of known type, and with an exhaust passage 28 opening through the roof of chamber 25 and controlled by an exhaust valve 29. The valves 27 and 29 are operated in proper timed relation to operation of the engine, by appropriate means well known in the art and which need not be described in detail.

Head 24 further comprises a primary supplementary chamber 30 opening into combustion chamber 25, at one side and substantially tangent thereto, through a restricted orifice 31 and a funnel-like passage 32 leading thereto and flaring inward of the combustion chamber. An injection nozzle 33 is appropriately mounted in head 24, in a known manner, and is provided with an injection port coaxial with the nozzle and opening into chamber 25 at the side thereof opposite to passage 32, this port being disposed to inject fuel across chamber 25 toward passage 32 and orifice 31 of the primary chamber 30. A secondary supplementary chamber 34 opens into combustion chamber 25, through a restricted orifice 35 and funnel-like passage 36 leading thereto and flaring inward of chamber 25, passage 36 and orifice 35 being inclined inward of chamber 25, toward the nozzle 33 and substantially tangent to the surrounding wall of combustion chamber 25 between the tip of nozzle 33 and passage 32. The operation of the engine shown in Figures 3 and 4 is, in general, similar to that of the engine shown in Figures 1 and 2, and need not be described in detail. The blast ejected from chamber 30 passes into and by the passage 36, serving to charge chamber 34 with a quickly burning fuel mixture, this blast tending to rotate clockwise within chamber 25, as viewed in Figure 4. The blast from chamber 30 is then followed by the blast from chamber 34, the latter blast being tangent to the surrounding wall of chamber 25 and tending to rotate counterclockwise therein, as viewed in Figure 4. These two blasts meet head-on, as indicated by the arrows in Figure 4, resulting in increased high general turbulence within combustion chamber 25 effective for maintaining a high rate of combustion within the latter chamber.

Figure 2:
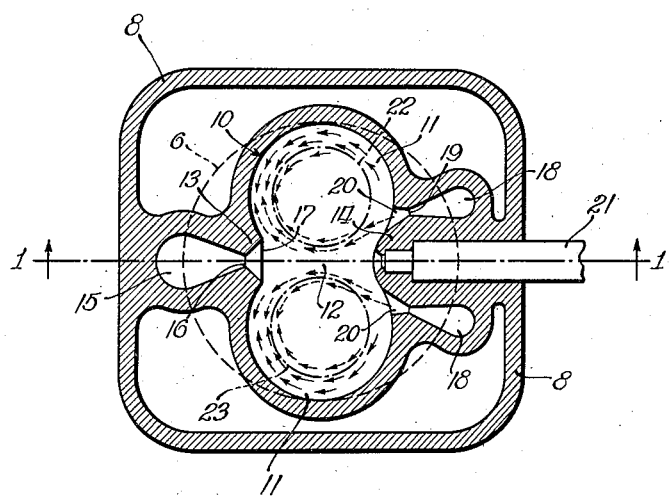
Figure 2 is a sectional view taken substantially on line 2—2 of Figure 1, certain parts being shown in elevation.

In the indicator card of Figure 5, the line t. c. indicates the inner or top dead center position of the piston, the numbers appearing to the left and the right of this line indicate the degrees of angle of the crank shaft before and after top dead center, respectively, curve 10 is the time-pressure curve of the combustion chamber 10 of Figures 1 and 2, curve 15+18 is the time pressure curve of the supplementary chambers 15 and 18, curve 15 taken with curve 15+18 is the time pressure curve of chamber 15, and curve 18 taken with curve 15+18 is the time pressure curve of the chambers 18. At about top center position of the piston combustion is initiated in the main combustion chamber 10, followed by a slow pressure rise in this chamber. Shortly thereafter combustion occurs in the primary supplementary chamber 15 causing a steep pressure rise in this chamber, as indicated by the curve 15, followed by the blast from chamber 15 into chamber 10 causing an increase in the rate of combustion within the latter chamber with resulting rise in pressure therein, as will be clear from curve 10. When the pressure within chamber 15 has fallen off to a considerable extent, combustion occurs within the secondary supplementary chambers 18 with an abrupt rise in the pressure therein, but not to such a high value as the maximum pressure within chamber 15, as will be clear from curve 18. This rise in pressure within the chambers 18 results in blasts therefrom into the combustion chamber with resulting turbulence and acceleration in the rate of combustion within the latter chamber, causing a further increase in pressure therein, as will be clear from curve 10. As a result of the successive blasts from the supplementary chambers, the rate of combustion within chamber 10 increases and highly effective combustion pressure conditions are attained, the peak pressure within the combustion chamber occurring about 20° of the crank angle after top center position of the piston. This is conducive to maintaining substantially constant pressure within the cylinder during a considerable portion of the combustion or working stroke of the piston, with resulting material increase in efficiency and smoothness of operation of the engine.

In my copending application for injection engine, Serial No. 155,031, filed July 22, 1937, I have more fully considered and claimed the head-on collision of the blasts from the supplementary chambers with resulting increased turbulence and improved combustion. The instant application is directed more particularly to the successive blasts from the supplementary chambers for the purposes and with the advantages previously set forth.

I claim:

1. In an injection engine, a cylinder and a piston operating therein, a combustion chamber opening into said cylinder, a primary supplementary chamber opening into said combustion chamber at one side thereof through a restricted orifice and a passage leading therefrom flaring inward of said combustion chamber, an injection nozzle having a port at the opposite side of said combustion chamber disposed to inject fuel toward and into said passage and into said primary chamber in amount to form therein a quick burning fuel-air mixture causing creation of relatively high pressure within said primary chamber incident to combustion therein and resultant ejection therefrom of a high pressure high velocity blast through said passage into said combustion chamber, and a secondary supplementary chamber opening into said combustion chamber at said opposite side thereof through a restricted orifice and a passage leading therefrom flaring inward of said combustion chamber and substantially opposed to and in the path of travel of the blast ejected from said primary chamber, whereby said secondary chamber is charged by said blast with a quick burning fuel-air mixture, said secondary chamber being otherwise closed to entry of fuel.

2. In an injection engine, a cylinder and a piston operating therein, a combustion chamber having a wall of substantially circular curvature in a plane normal to the cylinder axis opening into said cylinder, a primary supplementary chamber opening into said combustion chamber at one side thereof through a restricted orifice and a passage leading therefrom flaring inward of said combustion chamber and substantially tangent to said wall, an injection nozzle having a port at the opposite side of said combustion chamber disposed to inject fuel toward and into said passage and into said primary chamber in amount to form therein a quick burning fuel-air mixture causing creation of relatively high pressure within said primary chamber incident to combustion therein and resultant ejection therefrom of a high pressure high velocity blast through said passage into said combustion chamber, and a secondary supplementary chamber opening into said combustion chamber at said opposite side thereof through a restricted orifice and a passage leading therefrom flaring inward of said combustion chamber and substantially opposed to and in the path of travel of the blast ejected from said primary chamber, whereby said secondary chamber is charged by said blast with a quick burning fuel-air mixture, said passage of said secondary chamber being disposed to direct a blast ejected therethrough toward said one side of said wall substantially tangent thereto, whereby the blast from said secondary chamber travels around said combustion chamber oppositely to the blast from said primary chamber and the two blasts meet substantially head-on creating high general non-rotary turbulence within said combustion chamber, said supplementary chambers being otherwise closed to entry of fuel.

3. In an injection engine, a cylinder and a piston operating therein, a combustion chamber having a wall of substantially circular curvature in a plane normal to the cylinder axis opening into said cylinder, a primary supplementary chamber opening into said combustion chamber at one side thereof through a restricted orifice and a passage leading therefrom flaring inward of said combustion chamber and substantially tangent to said wall, an injection nozzle having a port at the opposite side of said combustion chamber disposed to inject fuel toward and into said passage and into said primary chamber in amount to form therein a quick burning fuel-air mixture causing creation of relatively high pressure within said primary chamber incident to combustion therein and resultant ejection therefrom of a high pressure high velocity blast through said passage into said combustion chamber, and a secondary supplementary chamber of materially less capacity than said primary chamber opening into said combustion chamber through a restricted orifice and a passage leading therefrom and flaring inward of said combustion chamber and opposed to and in the path of flow of a blast from said primary chamber, whereby said secondary chamber is charged by said blast with a quick burning fuel-air mixture, said passage of said secondary chamber being disposed to direct a blast ejected from said secondary chamber against said one side of said wall substantially tangent thereto, said supplementary chambers being otherwise closed to entry of fuel.

4. In an injection engine, a cylinder and a piston operating therein, a head for said cylinder, a combustion chamber in said head opening into said cylinder, said combustion chamber comprising in plan two substantially circular lobes with a constriction therebetween formed by an inward projection at one side and a splitting element of substantially V-shape in plan projecting inward from the opposite side of said combustion chamber, a primary supplementary chamber in said head opening into said combustion chamber at said projection through a restricted orifice and a funnel-like passage leading thereto and flaring inward of said combustion chamber, an injection nozzle opening into said combustion chamber at the vertex of said element through a port disposed to inject fuel directly into and across said constriction toward said passage and orifice, the latter being spaced from said nozzle port a distance materially less than the cylinder diameter and such that injected fuel enters said primary chamber in amount to form therein a quick burning fuel-air mixture causing creation of a relatively high pressure within said primary chamber incident to combustion therein and resultant ejection therefrom of a high pressure high velocity blast through said passage into said combustion chamber, and two secondary supplementary chambers opening into said combustion chamber adjacent the sides of the base of said splitting element through restricted orifices and funnel-like passages leading thereto and flaring inward of said combustion chamber and substantially opposed to and in the path of travel of the blast ejected from said primary chamber, whereby said secondary chambers are charged by said blast with a quick burning fuel-air mixture, said secondary chambers being otherwise closed to entry of the injected fuel.

5. In an injection engine, a cylinder and a piston operating therein, a combustion chamber opening into said cylinder comprising in plan two substantially circular lobes with a constriction therebetween formed by an inward projection at one side and a splitting element of substantially V-shape in plan projecting inward from the opposite side of said combustion chamber, a primary supplementary chamber opening into said combustion chamber at said projection through a restricted orifice and a passage leading thereto and flaring inward of said combustion chamber, an injection nozzle opening into said combustion chamber at the vertex of said element through a port disposed to inject fuel directly into and across said constriction toward said passage and orifice, the latter being spaced from said nozzle port a distance materially less than the cylinder diameter and such that injected fuel enters said primary chamber in amount to form therein a quick burning fuel-air mixture causing creation of a relatively high pressure within said primary chamber incident to combustion therein and resultant ejection therefrom of a high pressure high velocity blast through said passage into said combustion chamber, and two secondary supplementary chambers of materially less capacity than said primary chamber opening into said combustion chamber adjacent the sides of the base of said splitting element through restricted orifices and passages leading thereto and flaring inward of said combustion chamber and substantially opposed to and in the path of travel of the blast ejected from said primary chamber, whereby said secondary chambers are charged by said blast with a quick burning fuel-air mixture, said secondary chambers being otherwise closed to entry of the injected fuel.

6. In an injection engine, a cylinder and a piston operating therein, a head for said cylinder, a combustion chamber in said head substantially circular in plan opening into said cylinder, a primary supplementary chamber in said head opening into said combustion chamber at one side thereof through a restricted orifice and a funnel-like passage leading thereto and flaring inward of said combustion chamber, an injection nozzle opening directly into said combustion chamber at the opposite side thereof through a port disposed substantially in alignment with said passage and orifice on a chord of said combustion chamber, said orifice being spaced from said nozzle port a distance materially less than the cylinder diameter and such that injected fuel enters said primary chamber in amount to form therein a quick burning fuel-air mixture causing creation of a relatively high pressure within said primary chamber incident to combustion therein and resultant ejection therefrom of a high pressure high velocity blast through said passage into said combustion chamber, and a secondary supplementary chamber in said head opening into said combustion chamber substantially tangent thereto through a restricted orifice and a funnel-like passage leading thereto flaring inward of said combustion chamber and in and opposed to the path of flow of a blast ejected through said orifice and passage of said primary chamber, incident to combustion therein, into said combustion chamber, whereby said secondary chamber is charged by said blast with a quick burning fuel-air mixture, said secondary chamber being otherwise closed to entry of the injected fuel.

7. In an injection engine, a cylinder and a piston operating therein, a combustion chamber substantially circular in plan opening into said cylinder, a primary supplementary chamber opening into said combustion chamber at one side thereof through a restricted orifice and a passage leading therefrom flaring inward of and substantially tangent to said combustion chamber, an injection nozzle opening directly into said combustion chamber at the opposite side thereof through a port disposed in substantial alignment with said passage and orifice and spaced therefrom a distance materially less than the cylinder diameter and such that injected fuel enters said primary chamber in amount to form therein a quick burning fuel-air mixture causing creation of a relatively high pressure within said primary chamber incident to combustion therein and resultant ejection therefrom of a high pressure high velocity blast through said passage into said combustion chamber, and a secondary supplementary chamber of materially less capacity than said primary chamber opening into said combustion chamber substantially tangent thereto through a restricted orifice and a passage leading therefrom flaring inward of said combustion chamber and in and opposed to the path of flow of a blast ejected through said orifice and passage of said primary chamber, incident to combustion therein, into said combustion chamber, whereby said secondary chamber is charged by said blast with a quick burning fuel-air mixture, said secondary chamber being otherwise closed to entry of the injected fuel.

HANS FISCHER.